United States Patent

Ribner et al.

[11] Patent Number: 5,917,809
[45] Date of Patent: Jun. 29, 1999

[54] ASYMMETRIC DIGITAL SUBSCRIBER LOOP MODEM AND METHOD

[75] Inventors: David B. Ribner, Andover; David H. Robertson, Roxford, both of Mass.

[73] Assignee: Analog Devices, Inc., Norwood, Mass.

[21] Appl. No.: 08/779,806

[22] Filed: Jan. 8, 1997

[51] Int. Cl.$^6$ .............................. H04B 3/23; H04M 1/00
[52] U.S. Cl. ........................................... 370/286; 379/410
[58] Field of Search ..................................... 379/406, 410, 379/411, 93.01, 93.03, 93.09; 370/268, 269, 286

[56] References Cited

U.S. PATENT DOCUMENTS

| | | | |
|---|---|---|---|
| 4,270,026 | 5/1981 | Shenoi et al. | 704/265 |
| 4,531,220 | 7/1985 | Brie et al. | 375/232 |
| 4,799,214 | 1/1989 | Kaku | 370/291 |
| 5,051,981 | 9/1991 | Kline | 370/290 |
| 5,285,474 | 2/1994 | Chow et al. | 375/13 |
| 5,293,401 | 3/1994 | Serfaty | 375/13 |
| 5,317,596 | 5/1994 | Ho et al. | 375/14 |
| 5,579,305 | 11/1996 | Norrell et al. | 370/286 |
| 5,623,513 | 4/1997 | Chow et al. | 375/219 |
| 5,757,849 | 5/1998 | Gelblum et al. | 375/222 |

FOREIGN PATENT DOCUMENTS 0 498 369 A2   8/1992   European Pat. Off. .

WO 95/17049   6/1995   WIPO .

*Primary Examiner*—Daniel S. Hunter
*Assistant Examiner*—Charles N. Appiah
*Attorney, Agent, or Firm*—Fish & Richardson PC

[57] ABSTRACT

A method and apparatus for operating an asymmetric digital subscriber loop modem system. A modem at a central office transmits information to a modem at a remote terminal on a down-stream signal having a predetermined bandwidth and the modem at the remote terminal transmits information to the modem at the central office on an up-stream signal having a bandwidth lower than the predetermined bandwidth of the down-stream signal. Digital samples of the up-stream signal in the central office modem are produced. Digital samples representative of an estimated echo signal in the central office modem are also produced. The digital samples of the up-stream signal and the digital samples representative of an estimated echo signal are both fed to a subtractor at the same rate. In a preferred embodiment, the up-stream signal is oversampled (i.e., is sampled at a rate greater than the Nyquist sampling rate) in producing the digital samples thereof. Samples of the down-stream signal are fed to an echo cancellation filter. The filter output is decimated to a predetermined rate. The samples of the oversampled up-stream signal are decimated producing samples at the predetermined rate. Both the decimated samples of the oversampled up-stream signal and the decimated samples of the filter are fed to the subtractor at the predetermined rate.

5 Claims, 5 Drawing Sheets

ASYMMETRIC DIGITAL SUBSCRIBER LOOP MODEM AND METHOD

BACKGROUND OF THE INVENTION

This invention relates generally to asymmetric digital subscriber loop (ADSL) modems and more particularly to discrete multi-tone (DMT) asymmetric digital subscriber loop (ADSL) modems.

As is known in the art, modems have been used to transfer data through a communication media, such as a twisted pair telephone line. One such system 10 is shown in FIG. 1. (It is understood that the system 10 is shown greatly simplified and various filters have not been shown.) Here, a pair of modems (i.e., transceivers) 12, 14 are coupled through a transmission medium 16. Each modem 12, 14 includes a transmitter section 18 and a receiver section 20 isolated by a hybrid 24, as shown. The signal to be transmitted from modem 12 to modem 14, or from modem 14 to modem 12, is a digital signal produced by a digital modulator 16 at the same sampling rate $f_s$. In order to reduce the effect of echo from the transmitter 18 from adversely effecting the received signal, echo cancelers 26 have been used. For example, when an upstream signal 28 is transmitted by one of the modems 12, 14 here the modem 12, to the receiver 20 of modem 14, an echo signal 30 may be produced at the receiver 20 of modem 12. Superimposed on the echo signal 30 may be an upstream signal 32 transmitted by transmitter 18 of modem 14. Thus, the receiver 20 of modem 12 receives a composite of echo signal 30 and upstream signal 32. The echo canceler 26 is provided to reduce, or cancel the echo signal. It should be noted that echo signal is dependant on the impedance characteristics of the transmission medium 16 and therefore vary from installation to installation. Echo canceler 26 compensates adaptively for these variations. More particularly, the echo signal 30, during an initial training mode, switch 34 is placed in the "down" position so that the output 39 of a weight update computation module 35 transmits an impulse, or a training pattern, to the modem 14. During this training mode, the modem 14 does not transmit the upstream signal 32. Any resulting echo signal 30 is detected by the weight update computation module 35 as an "error" signal out of subtractor 36. The weight update computation module 35 determines the impulse response of the impulse transmitted by the weight update module 35. That is, weight update computation module 35 determines the impulse response of the transmit echo signal path 30. With one technique, the module 35 includes a Fast Fourier Transform (not shown) for determining from the time response to the impulse, the transfer function between the input of switch 34 and the output of the subtractor 36 through the echo signal path 30. Once determined, the weight computation module 35 produces coefficients for an echo canceler finite impulse response filter 37 so that the transfer function from the input to the filter 37 to the output thereof, i.e., to the subtractor 36, is the same as the transfer function between the input of switch 34 and the output of the subtractor 36 through the echo signal path 30.

Thus, during normal operation, with switch 34 in the "up" position shown in FIG. 1, an estimate of the echo signal is produced by the filter 37 and such estimate of the echo signal 30 is subtracted from the composite signal 31 made up of the echo signal 30 and the upstream signal 32 in subtractor 36 with the result that the echo signal 30 is cancelled from the composite signal 31. A similar echo signal cancellation takes place in modem 14.

As is also known in the art, ADSL modems achieve full-duplex operation over a single pair of subscriber loop (i.e., twisted pair telephone line) through the use of either frequency-division-multiplexing (FDM) or echo cancellation (EC). Some ADSL modems use DMT, a multi-carrier modulation technique, to achieve high bandwidth efficiency over a bandwidth of about 1.024 MHz (more precisely, 1.104 MHz). An ADSL transceiver system generally includes a modem at a central station, or office, adapted to transmit information in a down-stream signal to a modem at a remote terminal and to receive information in an up-stream signal transmitted by the modem at the remote terminal. The up-stream and down-stream signals pass through a common transmission medium, typically the twisted-pair telephone line. The up-stream signal comprises data carried by a lower portion of a band of frequencies extending over M, here 255, subchannels; i.e., the lower 31 subchannels. The down-stream signal comprises data carried by an upper portion of the 255 subchannels; i.e., the upper subchannels from sub-channel 1 through 255). (The generation of these M sub-channels may be with an N point Fast Fourier Transform (F.F.T.), where the N point F.F.T. provides $M=(N/2)-1$ subchannels; i.e., here N=512). Thus, this frequency band asymmetry is intended to accommodate a large down-stream signal data rate to support data-hungry applications such as video-on-demand and Internet access, and a low up-stream signal data rate for interactive control and basic-rate IDSN. This is implemented by employing an eight times wider bandwidth for the down-stream signal than for the up-stream signal. In terms of the multi-carrier modulation, the down-stream signal bandwidth consists of carrier subchannels 1 through 255 whereas the up-stream signal bandwidth consists of only carrier subchannels 1 through 31; in actual practice the first 6 to 8 carrier subchannels are used as a guard-band for plain ordinary telephone service (POTS). An EC based system makes use of the carrier allocation just mentioned, however, FDM systems avoid the overlap of up-stream and down-stream signal bandwidths by using a carrier assignment such as subchannels 35 through 255 for the down-stream subchannels and 8 through 31 for the up-stream subchannels, for example.

One such DMT FDM ADSL system 110, shown in FIG. 2, is adapted to exchange information between a modem 112 at a first station, here a central office (CO), and a modem 114 at a second station, here a remote terminal (RT), through a common communication medium 116, here a twisted-pair telephone line. The system 110 includes: a transmitter (TX) section 118, at the central office modem 112, for distributing a first stream of data on line 113 among a plurality of, M, (here 255) carrier frequencies. More particularly, the transmitter section 118 of the central office modem 112 includes a modulator 120, here for receiving frames of the data on line 113 and for distributing such data over the upper portion of the plurality of, M, carrier frequencies. Here, the modulator 120 includes a Quadrature Amplitude Modulator (Q.A.M.) encoder 124 and an Inverse Fast Fourier Transformer (I.F.F.T.) 126 arranged in as conventional manner as shown. Here, the I.F.F.T. 126 is a 512 point I.F.F.T. Thus, the incoming data on line 113 is selectively encoded by the Q.A.M. encoder 124 at a frame rate, $f_r$, here about 4 KHz (more precisely 4.0588 KHz) and the I.F.F.T. 126 produces for each frame a sequence of digital samples on line 122 at a rate $f_s=2(M+1)f_r$. More particularly, the sequence of digital samples on line 113 is encoded by Q.A.M. encoder 124 onto the 512 input lines $128_0$–$128_{511}$ of the I.F.F.T. 126 as a sequence of frames, here at a frame, or symbol rate of 4 KHz. Thus, for each frame of data fed to lines $128_0$–$128_{511}$ a sequence of digital samples is produced by the I.F.F.T. 126 on line 122 at a sampling rate of about $f_s=2.048$ MHz (more precisely 2.208 MHz).

The transmitter section 118 of the central office modem 112 also includes: a digital to analog converter (DAC) 130 for converting the sequence of samples of digital samples into a corresponding analog signal on line 132 at the rate $f_s=2.048$ MHz; and a band pass filter 134, fed by the analog signal. The pass band filter 134 has a pass band extending over the upper portion of the M carrier frequencies, for producing, after passing through a conventional isolation hybrid 136, on the common communication medium 116, the down-stream signal having a band width extending over the upper portion of the M carrier frequencies; here over subchannels 35 through 255.

The remote terminal modem 114 includes a receiver (RX) section 140 having: a band pass filter 142, coupled to the common communication medium 116 via a hybrid 143, for passing signals in the down-stream signal fed thereto by the central office modem 112 transmitter section 118. As noted above, the data in the down-stream signal extends over the upper portion of the M carrier frequencies (i.e., subchannels 35 through 255). An analog to digital converter (ADC) 144 is provided for converting the signals passed by the band pass filter 142 into a sequence of digital data on bus 146. The data on bus 146 is produced at the sampling rate, $f_s$. A demodulator 148 is fed by the sequence of data samples produced by the analog to digital converter 144 on bus 146, for separating such digital data in such samples on bus 146 into the upper portion of the plurality of M carrier frequencies (i.e., into subchannels 35 through 255, it being understood that only the data in subchannels 35 through 255 are of interest). More particularly, the demodulator 148 includes a Time Domain Equalizer (T.D.Q.)/512 point Fast Fourier Transformer (F.F.T.) 150 and a Q.A.M. decoder 152, arranged in a conventional manner as shown to provide, ideally, a stream of data on line 154 corresponding to the stream of data line 113.

The remote terminal modem 114 includes a transmitter section 160, for distributing a second stream of data fed to the remote terminal modem 114 on line 163 among the lower portion of the plurality, M, 4 KHz wide, carrier frequencies (i.e., on channels 8 through 31). More particularly, the transmitter section 160 includes a modulator 162, here for receiving the data on line 163 and for distributing such data over subchannels 8 through 31. Here, the modulator 162 includes a Quadrature Amplitude Modulator (Q.A.M.) encoder 164 and an Inverse Fast Fourier Transformer (I.F.F.T.) 166 arranged in as conventional manner as shown. Here, the I.F.F.T. 166 is a 64 point I.F.F.T. Thus, the incoming data on line 163 is selectively encoded by the Q.A.M. encoder 164 at the frame rate, $f_r$, here approximately 4 KHz and the I.F.F.T. 166 produces for each frame a sequence of digital samples on line 170 at a rate $f_s/8=2(M+1)f_r/8$. More particularly, the sequence of digital samples on line 163 is encoded by Q.A.M. encoder 164 onto the 64 input lines $168_0$–$168_{63}$ of the I.F.F.T. 166 as a sequence of frames, here at a frame rate of approximately 4 KHz. Thus, for each frame of data fed to lines $168_0$–$168_{63}$, a sequence of digital samples is produced by the I.F.F.T. 166 on bus 170 at a rate of approximately $f_s/8=256$ KHz.

The transmitter section 160 of the remote terminal modem 114 also includes: a digital to analog converter (DAC) 172 for converting the sequence of samples of digital samples on bus 170 into a corresponding analog signal on line 174. A lowpass filter 176 is fed by the analog signal and has a bandwidth extending over the lower portion of the M carrier frequencies (i.e., from dc to 128 KHz (i.e., subchannel 31)), for producing, after passing through a conventional isolation hybrid 143, on the common communication medium 116, the up-stream signal having a band width extending over such lower portion of the M carrier frequencies; here over subchannels 8 through 31.

The central office modem 112 includes a receiver section 180 having: a lowpass filter 182, coupled, via the isolation hybrid 136, to the common communication medium 116, for passing signals in the up-stream signal fed thereto by the remote terminal modem 114 extending over lower portion of the M carrier frequencies, here over subchannels 8 through 31. An analog to digital converter 184 is provided for converting the signal passed by the lowpass filter 182 into a sequence of digital data on bus 186 at the sampling rate, $f_s/8$. A demodulator 188 is fed by the sequence of samples produced by the analog to digital converter 184 on bus 186 for combining the digital data in such samples into the lower portion of the M carrier frequencies (i.e., the data in subchannels 8 through 31) into a data stream on line 190 corresponding, ideally, to the data stream on line 163. Here, the demodulator 188 includes a Time Domain Equalizer (T.D.Q.)/64 point Fast Fourier Transformer (F.F.T.) 192 and a Q.A.M. decoder 194. Thus, T.D.Q./ F.F.T. 192 separates the digital data fed thereto by the analog to digital converter 184 at rate $f_s/8$, into frames of data at the approximately 4 KHz frame rate among subchannels 1 through 31 (on lines $195_0$–$195_{63}$, respectively); it being understood that the data of interest will appear in subchannels 8 through 31. The data on lines $194_5$–$194_{31}$ are combined by the Q.A.M. encoder 194 to produce a properly arranged stream of data on line 190.

It should be noted that because the transform size used for the up-stream signal (i.e., a 64 point I.F.F.T.) is different from the transform size used for the down-stream signal (i.e., a 512 point I.F.F.T.) transforms in both directions are performed at the same symbol rate so that the frequency spacing of the multi-carrier signals is equivalent upstream (US) and downstream (DS). Given a fixed symbol rate, the downstream sample rate is 512 times the symbol rate and the upstream (US) sample rate is 64 times the symbol rate. In other words, the sample rates differ by a factor of eight because of the eight-fold difference in transform size.

More particularly, a conventional echo canceler at the central office modem 112 consists of a transversal filter with an input driven by the output of the I.F.F.T. and an output that is subtracted from the output of the ADC 144. The output rate of the transversal filter must be compressed by a factor of eight before subtracting it from the ADC 44. This unfortunately will alias the downstream (DS) signal band from $f_s/16$ to $f_s/2$ into the upstream (US) band. Instead of cancelling the echo, the interference is actually larger in this circumstance. Similarly, applying echo cancellation to the remote terminal modem is also problematic. In this case, the rate of the transversal filter is eight times slower than the ADC 144, and must be expanded by a factor of eight. This will lead to images of the echo estimates falling in the band between $f_s/16$ and $f_s/2$ causing considerable interference. Frequency domain echo cancellation algorithms have been described in U.S. Pat. No. 5,317,596 issued May 31, 1994, entitled "Method and Apparatus for Echo Cancellation with Discrete Multitone Modulation"; however, they are relatively complex to implement.

Even in a frequency division multiplexed system, echo cancellation is desirable for reducing sidelobe interference extending beyond the main signal band. FIG. 3 shows the power spectral density (PSD) of the upstream (US) and downstream (DS) signals as seen at the receiver of the remote terminal modem. In general, the sidelobes of a single subcarrier produces a PSD that is the sum of the sinc functions shifted by a frequency increment equal to the ADSL frame rate resulting in larger sidelobe levels than produced by a single carrier. In FIG. 3, the interference of the upstream (US) signal into the downstream (DS) band is evident. The upstream (US) signal is reduced by the attenuation of the hybrid and the US transmitter lowpass filter (LPF) and the downstream (DS) receiver bandpass filter at the central office modem. However, despite the attenuation, the sidelobes are still large enough to seriously limit the signal-to-noise ratio (SNR) of the received signal and reduce the data rate capability of the modem. As shown in FIG. 3, the SNR is the difference in the ordinate lengths of the two curves. One way to minimize the interference of the sidelobes of the echo signal is to induce a large guard band between the upstream (US) signal and the downstream (DS) signal bands. This, however, wastes a substantial portion of the signal bandwidth and of course seriously limits the potential data rate of the modem.

SUMMARY OF THE INVENTION

In accordance with the present invention, a method and apparatus is provided for operating an asymmetric digital subscriber loop modem system. A modem at a central office transmits information to a modem at a remote terminal on a down-stream signal having a predetermined bandwidth and the modem at the remote terminal transmits information to the modem at the central office on an up-stream signal having a bandwidth lower than the predetermined bandwidth of the down-stream signal. Digital samples of the up-stream signal in the central office modem are produced. Digital samples representative of an estimated echo signal in the central office modem are also produced. The digital samples of the up-stream signal and the digital samples representative of an estimated echo signal are both fed to a subtractor at the same rate to cancel echo signals resulting from the signal transmitted by the central office.

In a preferred embodiment, the up-stream signal is oversampled (i.e., is sampled at a rate greater than the Nyquist sampling rate) in producing the digital samples thereof. Samples of the down-stream signal are fed to an echo cancellation filter. The output of the echo-cancellation filter is decimated to a predetermined rate. Decimation incorporates low pass filtering and sample rate compression. The samples of the oversampled up-stream signal are decimated producing samples at the predetermined rate. Both the decimated samples of the oversampled up-stream signal and the decimated samples produced by the decimator are fed to the subtractor at the same predetermined rate.

BRIEF DESCRIPTION OF THE DRAWINGS

Other features of the invention, as well as the invention itself will become more readily apparent with reference to the following detailed description taken together with the following drawings, in which.

DESCRIPTION OF THE PREFERRED EMBODIMENTS

Figure 4A:
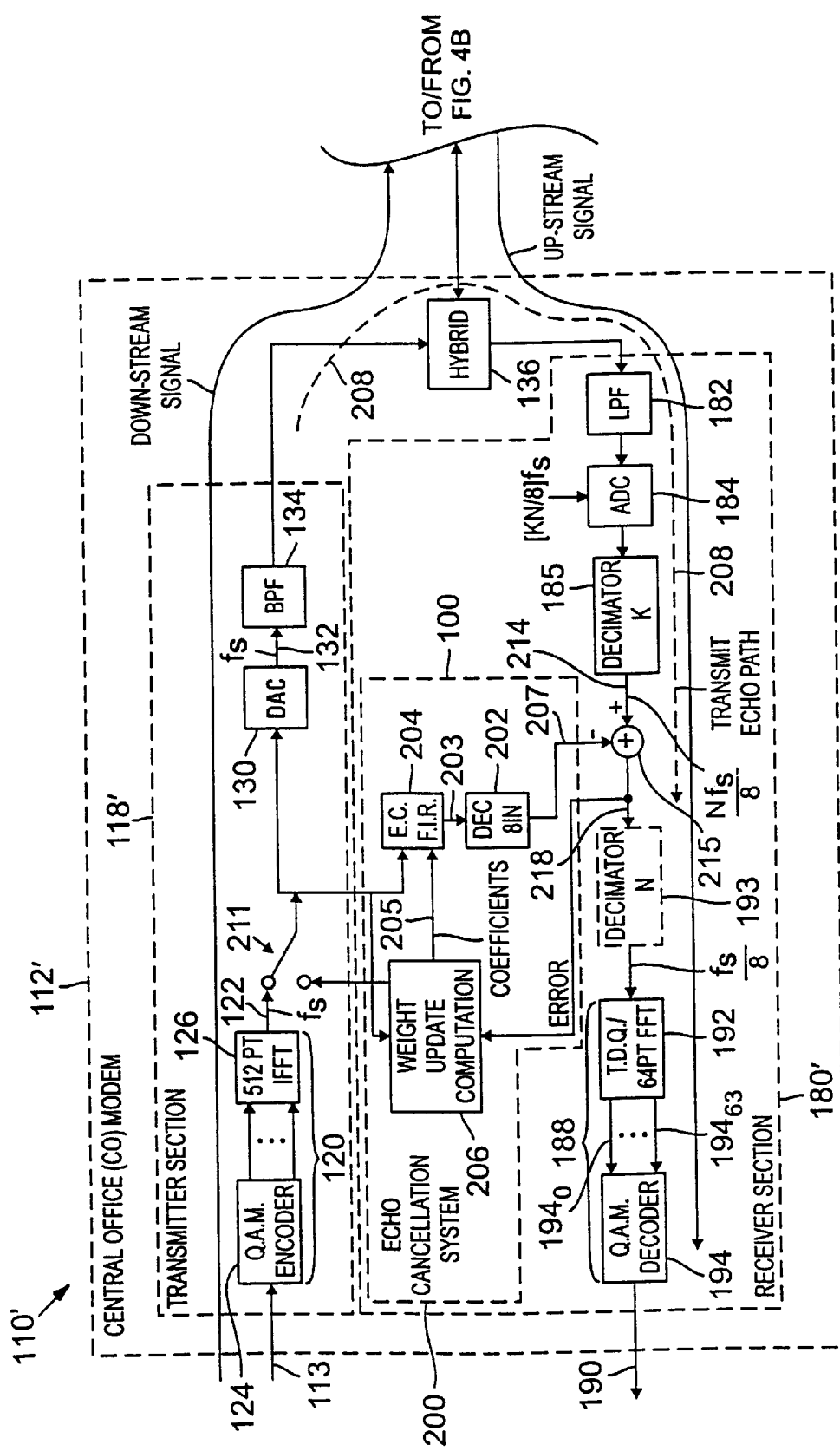
FIGS. 4A and 4B is a block diagram of a DMT ADSL system according to the invention.
Figure 4B:
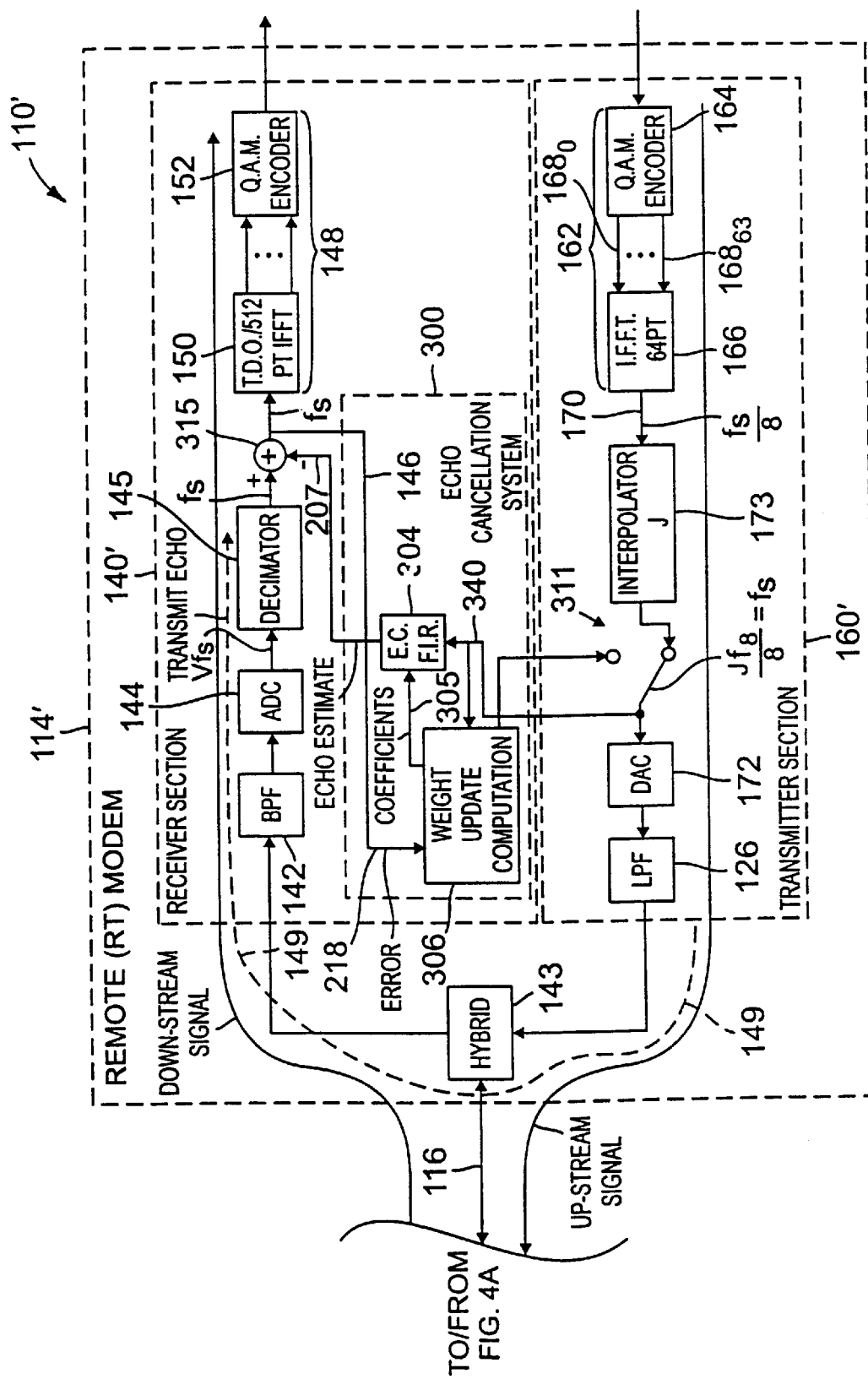

Referring now to FIGS. 4A and 4B a DMT ADSL system 110' is shown. System 110', like system 110 (FIG. 2), is adapted to exchange information between a modem 112' at a first station, here a central office (CO), and a modem 114' at a second station, here a remote terminal (RT), through a common communication medium, here a twisted-pair telephone line 116. The system includes: a transmitter section 118', at the first station 112', for distributing a first stream of data among a plurality of, M, (here 255) carrier frequencies. Thus, like system 110 in FIG. 2, a transmitter section 118', at the central office modem 112', is provided for distributing a first stream of data on line 113 among a plurality of, M, (here 255) carrier frequencies. More particularly, the transmitter section 118' of the central office modem 112' includes a modulator 120, here for receiving frames of the data on line 113 and for distributing such data over the upper portion of the plurality of, M, carrier frequencies. Here, the modulator 120 includes a Quadrature Amplitude Modulator (Q.A.M.) encoder 124 and an Inverse Fast Fourier Transformer (I.F.F.T.) 126 arranged in as conventional manner as shown. Here, the I.F.F.T. 126 is a 512 point I.F.F.T. Thus, the incoming data on line 113 is selectively encoded by the Q.A.M. encoder 124 at a frame rate, $f_r$, here approximately 4 KHz and the I.F.F.T. 126 produces for each frame a sequence of digital samples on line 122 at a rate $f_s=2(M+1)f_r$, as described above in connection with FIG. 2.

The transmitter section 118' of the central office modem 112' also includes: an echo cancellation system 200; a digital to analog converter 130 for converting the sequence of samples of digital samples into a corresponding analog signal on line 132, after passing through a multiplexer 211, to be described in connection with the echo cancellation system 200, at a rate $f_s$; and a band pass filter 134, fed by the analog signal and having a pass band extending over the upper portion of the M carrier frequencies, for producing, after passing through a conventional isolation hybrid 136, on the common communication medium 116, the down-stream signal having a band width extending over the upper portion of the M carrier frequencies; here over subchannels 35 through 255 as described above in connection with FIG. 2.

The remote terminal modem 114' includes a receiver section 140' having: a band pass filter 142, coupled to the common communication medium 116 via a hybrid 143, for passing signals in the down-stream signal fed there by the central office modem 112' transmitter section 118'. As noted above, the data in the down-stream signal extends over the upper portion of the M carrier frequencies (i.e., subchannels 35 through 255. An analog to digital converter 144 is provided for converting the signals passed by the band pass filter 142 into a sequence of digital data on bus 146. Here, the digital signals are produced by the ADC 114 at a rate $Vf_s$, where V is an integer greater than 1, here 4. The output of the ADC 146 is fed to a decimator 145. Decimator 145 produces digital samples at the rate $f_s$ (i.e., decimates by a factor, V, provides low pass filtering and sample rate compression). The receiver section 140' includes an echo cancellation system 300, to be described, and a demodulator 148. The demodulator 148 is fed by the sequence of data samples produced by a subtractor 315 at the rate $f_s$ used to subtract the decimator 145 and an estimate of the transmit echo signal produced in transmit echo path 149 from refections on the transmission medium 116 which pass through hybrid 143 to the subtractor 315. It is noted that the data on bus 146 and the data on bus 207 from canceler 300 are at the same rate, $f_s$. The downstream signal, after having subtracted from it by the echo estimate produced by the echo cancellation system 300 on bus 207, is fed to the demodulator 148 for separating the digital data produced at the output of subtractor 315 into the upper portion of the plurality of M carrier frequencies (i.e., into subchannels 1 through 255, it being understood that only the data in subchannels 8 through 255 are of interest). More particularly, the demodulator 148 includes a Time Domain Equalizer (T.D.Q.)/512 point Fast Fourier Transformer (F.F.T.) 150 and a Q.A.M. decoder 152, arranged in a conventional manner as shown to provide a stream of data on line 154 corresponding to the stream of data line 113.

The remote terminal modem 114' includes a transmitter section 160', for distributing a second stream of data fed to the remote terminal modem 114' on line 163 among the lower portion of the plurality, M, 4 KHz wide, carrier frequencies. More particularly, the transmitter section 160' includes a modulator 162, here for receiving the data on line 163 and for distributing such data over subchannels 8 through 31. Here, the modulator 162 includes a Quadrature Amplitude Modulator (Q.A.M.) encoder 164 and an Inverse Fast Fourier Transformer (I.F.F.T.) 166 arranged in as conventional manner as shown. Here, the I.F.F.T. 166 is a 64 point I.F.F.T. Thus, the incoming data on line 163 is selectively encoded by the Q.A.M. encoder 164 at the frame rate, $f_r$, here 4 KHz and the I.F.F.T. 166 produces for each frame a sequence of digital samples on line 170 at a rate $f_s/8$. More particularly, the sequence of digital samples on line 163 is encoded by Q.A.M. encoder 164 onto the 64 input lines $168_0$–$168_{63}$ of the I.F.F.T. 166 as a sequence of frames, here at a frame rate of 4 KHz. Thus, for each frame of data fed to lines $168_0$–$168_{63}$, a sequence of digital samples is produced by the I.F.F.T. 166 on bus 170 at a rate of $f_s/8=256$ KHz.

Figure 1:
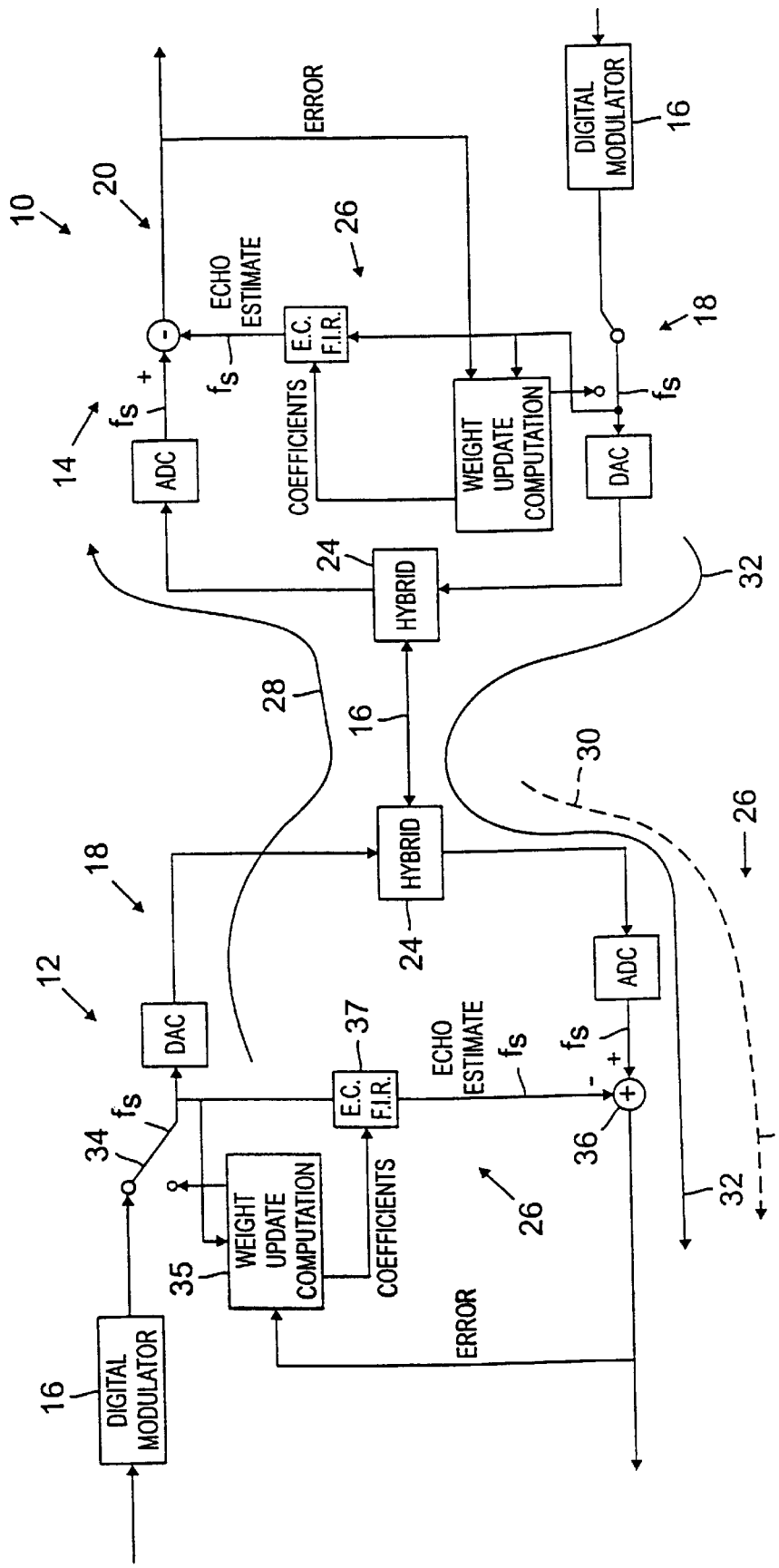
FIG. 1 is a block diagram of a modem system according to the PRIOR ART.
Figure 2:
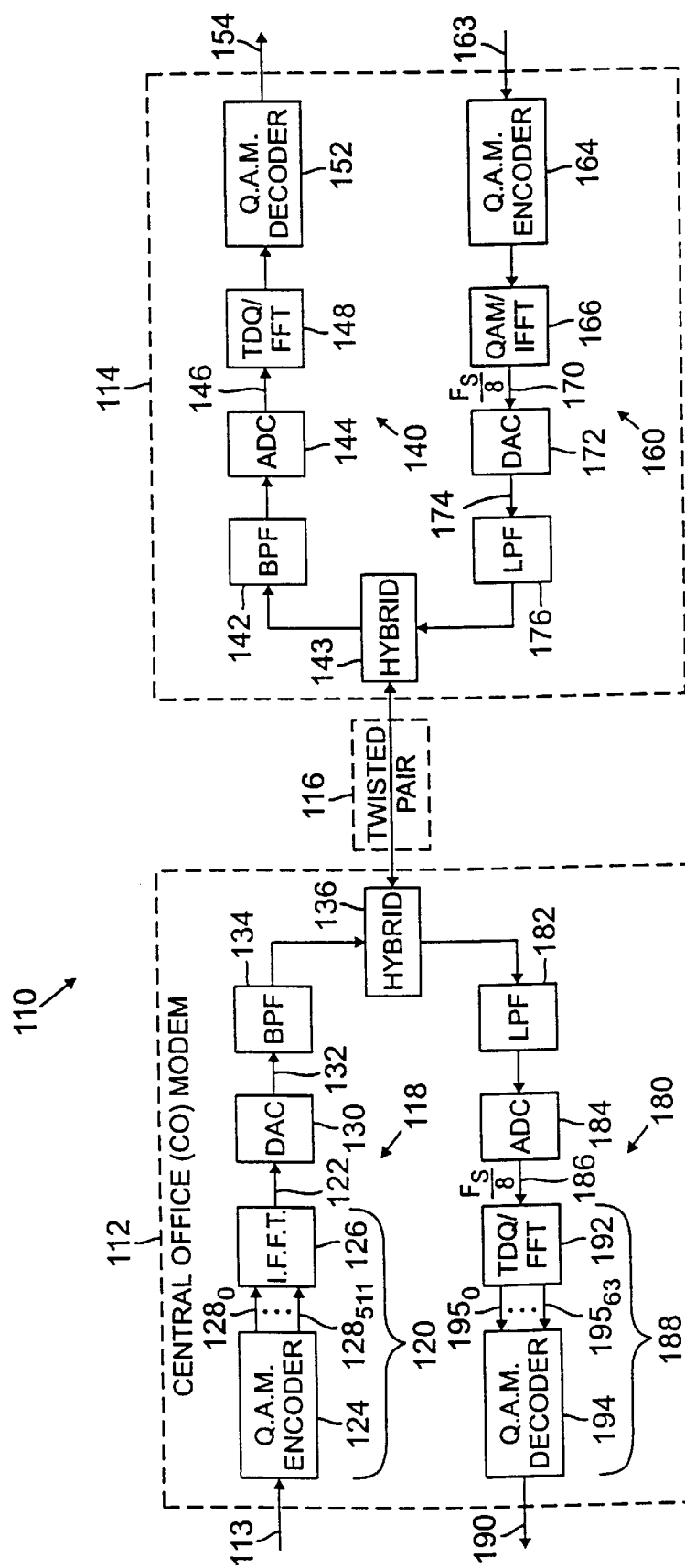
FIG. 2 is a block diagram of a DMT ADSL system according to the PRIOR ART.

Here, however, unlike the system 110 of FIG. 2, a digital interpolator 173 is coupled to the output of the modulator 162 for adding interpolated data into a stream of data distributed by the remote terminal modem 14' to reduce the effect of imaging by increasing the rate at which samples are produced by the modulator 162 from the $f_s$ sampling rate to a rate $J*(f_s/8)$ prior to passing, via multiplexer 311, to be described in connection with the echo cancellation system 300, to the DAC 172 and lowpass filter 176', as shown. More particularly, the interpolator 173 adds interpolated digital samples between the digital samples to the samples being produced by the modulator 162 at the rate $f_s/8$. It is noted that digital low pass filtering action incorporated into the interpolator 173 enables digital suppression of the lower frequency images in the interpolator 173 so that the remaining images can be more easily and effectively removed by the low pass filter 176. Thus, the digital samples are produced by the interpolator 173 at the rate $Jf_s/8$, where J is an integer greater than, or equal to, 2. Thus, the oversampling ratio, J, (i.e., the ratio of the rate samples are produced by the interpolator 173 to the rate samples are being fed to the interpolator 173) of the interpolator 173 is the integer J. This oversampling (i.e., raises) the sampling rate from $f_s/8$ to $Jf_s/8$ at the DAC 172 and enables digital suppression of the lower frequency images in the interpolator 173 so that the remaining images can be more easily, and effectively removed by the analog transmitter section 160' low pass filter 176. The following TABLE shows the stopband frequencies for the lowpass filter 176 that are required for various choices of interpolation ratio, J, and indicates that the analog filter requirements for filter 176 progressively relax as J increases. The passband of the lowpass filter 176 is $f_s/16$, so that as the stopband frequency increases, the shape factor of the filter 176, (i.e., the ratio of the stopband frequency to the passband) increases.

TABLE

| Interpolation Ratio (J) | Lowpass Filter 176 Stopband Frequency | Lowpass Filter 176 Shape Factor |
| --- | --- | --- |
| 1 (no interpolation) | $f_s/16$ | 1 |
| 2 | $3f_s/16$ | 3 |
| 3 | $5f_s/16$ | 5 |
| 4 | $7f_s/16$ | 7 |
| J | $(2J-1)f_s/16$ | $2J-1$ |

The central office modem 112' includes a receiver section 180' having: a lowpass filter 182, with a bandwidth and stop band, here, the same as lowpass filter 176, described above. The output of the lowpass filter 182 is fed to ADC 184. ADC 184 here produces digital samples at a rate $KNf_s/8$, where K is the decimation ratio, i.e., the ratio of the rate data is fed to the decimator 185 to the rate data is produced by the decimator 185; where K is an integer equal to or greater than 2. The digital samples produced by the ADC 184 at the rate $KNf_s/8$ are decimated by a factor of K by digital decimator 185. Thus, digital samples are produced by the decimator 185 at a rate $(Nf_s/8)$. The oversampling by the analog to digital converter 184, reduces the amount of aliasing at the ADC 184 because the filtering provided by the decimator 185 attenuates signals in the bands above $Nf_s/16$ that are subject to aliasing when compressed back down to a rate of $Nf_s/8$ by the decimator 185. The selectivity of the analog lowpass filter 182 is significantly reduced depending on the oversampling as described in the TABLE above, which applies to filter 182.

The output of the decimator 185 is subtracted from an estimate of the transmit echo signal produced in transmit echo path 208 from refections on the transmission medium 116 which pass through hybrid 136 to the subtractor 215. It is noted that the data rate at the output of decimator 195 is $Nf_s/8$. Further, the data rate at the output of F.I.R. filter 204 on bus 307 is also at the same rate, $Nf_s/8$. Thus, the data rate of the data applied to subtractor 215 are both at the same rate, $Nf_s/8$. The upstream signal, after having the echo estimate produced by the echo cancellation system 200 subtracted from it, is fed via line 118 to the demodulator 188 through a divide by N decimator 193. The decimator 193 further reduces the amount of aliasing at the ADC 184 because the filtering of decimator 193 attenuates signals in the bands above $f_s/16$ (i.e., subchannel 31) that are subject to aliasing when compressed back down to a rate $f_s/8$ by decimator 193. The demodulator 188 is fed by the sequence of samples produced by the subtractor 215 after being decimated by N in decimator 193. It is noted that the decimator 193 is fed samples from the subtractor 215 at the first decimator 185 sampling rate $N(f_s/8)$ and produces output samples at a lower sampling rate, $f_s/8$. The samples produced by the decimator 193, after passing through the subtractor 215, are fed to the demodulator 188 at the lower sampling rate, $f_s/8$, and are converted into samples in the lower portion of the M carrier frequencies, (i.e., the data in subchannels 8 through 31) into a data stream on line 190 corresponding to the data stream on line 163. Here, the demodulator 188 includes the T.D.Q/64 point Fast Fourier Transformer (F.F.T.) 192 and Q.A.M. decoder 194. Thus, T.D.Q./F.F.T. 192 separates the digital data fed thereto by the decimator 193 at rate $f_s/8$, into frames of data at the 4 KHz frame rate among subchannels 1 through 31 (on lines $194_0$–$194_{63}$, respectively); it being understood that the data of interest will appear in subchannels 8 through 31. The data on lines $194_8$–$194_{31}$ are combined by the Q.A.M. encoder to produce a properly arranged stream of data on line 190.

Figure 3:
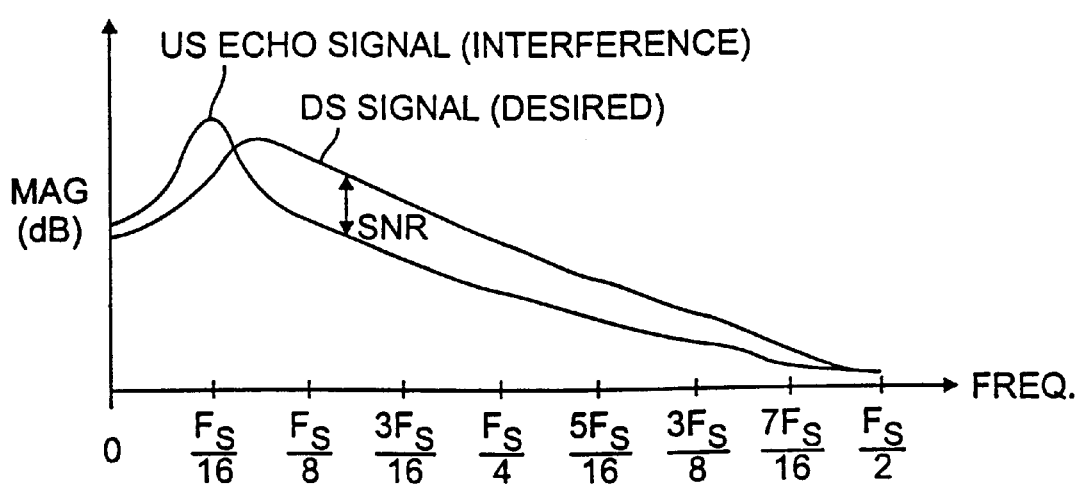
FIG. 3 are curves useful in understanding problems in the system of FIG. 1.

Referring now in more detail to echo cancellation system 200, it is first noted that system 110' uses multi-rate signal processing techniques (i.e., the rate of data into the cancellation system 200, here the rate $f_s$, is different from the rate data is produced at the output of the cancellation system 200, here the rate $Nf_s/8$. Further, the transmit and receive path make use of oversampling techniques described above (i.e., the ADC 184 samples at a rate $[KN/8]f_s$, which is higher than the Nyquist sampling rate, $f_s/8$. This oversampling significantly reduces the aliasing and imaging problems that result in interference between the upstream signal and downstream signal reception at both the remote terminal and the central office modems. The multi-rate echo cancellation system 200 includes a programmable transversal filter (FIR) 204 that serves as an echo canceler. The coefficients, or tap weights of the FIR 204 are produced by a weight update computation module 206 on line 205 and are set by the weight update computation module 206. These coefficients are estimates of samples of the impulse response of the transmit echo path 208 (i.e., the impulse response estimated for reflections, or echoes, generated by the transmitted downstream signal that appear at the input to subtractor 215). The output of the FIR 204 drives the input of a decimator 202 that decimates the rate $f_s$ of the downstream time domain signal after passing through E.C. FIR 204 (i.e., the signal on line 203) by a factor 8/(N) taking it to a rate $Nf_s/8$ on line 207. The filtering provided by the decimator 202 attenuates signals in the bands above $f_s/16$ (i.e., channel 31) that are subject to aliasing when compressed back down to a rate of $f_s/8$ by the decimator 202. The output of the decimator 202 (i.e., the signal on line 207) is an echo estimate that is subtracted from the receive signal path, i.e., the signal on line 214 (i.e., the output of decimator 185) to cancel the actual echo on the transmit echo path 208. The resulting difference signal produced on line 218 by the subtractor 215 (i.e., the difference between the signal on line 207 and the signal on line 214) is optionally decimated by a factor of N in the decimator 193 (shown in phantom) and is then passed through a time domain equalizer (T.D.Q)/ F.F.T 192 where it is fast Fourier transformed with a 64 point transform. It is noted that N is less than, or equal to, 8. (If N is equal to 8, the decimator 202 is not needed and the FIR 204 is fed directly to the input of subtractor 215.) In FIG. 3, if a decimation ratio for the decimator 193 equals unity, through appropriate values of N, then it is to be understood that the decimator 193 is not used. The output of the T.D.Q./F.F.T. 192 is fed to the Q.A.M decoder 194, as shown.

At the central office 112', it is important that the echo cancellation system 200 cancels the downstream signal from the upstream receive path over the frequency band 0 to $f_s/16$, or greater. In order to do this it is necessary to produce and echo estimate at a rate $f_s/8$ or higher. It is necessary to match the rate of the echo estimate to the rate of the received signal path to avoid imaging or aliasing effects. To accomplish this, a decimator 202 is disposed ahead of the echo canceler FIR 204.

A weight update (WUD) computation is performed during an initial training mode. During training, multiplexer 211 couples the output of the weight update computation module 206 to the FIR 204. Thus, in FIG. 3, multiplexer 211 is indicated around the weight update computation module 206 to allow it to drive the decimator 202 and FIR 204 and DAC 130 itself during training. Typically, in this context, a time domain algorithm is used for the weight update computation such as least means squared (LMS) or recursive least square (RLS) algorithms described in "Adaptive Filter Theory" by S. Haykin, published by Prentice Hall, Englewood Cliffs, N.J. 1986. The weight update computation needs access to the error signal on line 218 for either of these algorithms as shown in FIG. 4.

The remote terminal modem 114' also uses multi-rate echo cancellation. The transmit I.F.F.T. in I.F.F.T 166 is performed using a transform size of 64 points, and the successive interpolator 173 interpolates by a factor of J. The product J must equal 8 so that the rate of the echo canceler FIR 304 of echo cancellation system 300 matches the input rate of the T.D.Q./ F.F.T. 152.

During training, the weight update computation module 306 directly drives the input to the echo canceler FIR 304 and DAC 172 on line 340 through multiplexer 311, and also supplies FIR 304 with coefficients on line 305 and observes the resulting error signal produced by subtractor 315 on line 318. The weight update computation module 306 then computes the echo canceler weights on line 305 using an LMS or RLS algorithm. At the remote terminal 114', the sidelobes must be cancelled over the downstream band from 0 to $f_s/2$ thus the echo cancellation system 300 must have an output sample rate of $f_s$ to satisfy Nyquist's Theorem. This is accomplished by interpolator 173 providing interpolation to match the data rate to the echo canceler FIR 304 to the received signal path rate of $f_s$.

Another aspect of echo cancellation is symbol time alignment. At the remote terminal modem, the upstream signal frame timing is locked to the recovered downstream frame timing. An offset is adjusted between the downstream signal and the upstream signal frames at the remote terminal to minimize the echo signal prior to echo cancellation. This offset is determined during initialization by exhaustive search over all possible offset values from 0 to 511 and selecting the value that minimizes the echo signal at the downstream receiver.

It should be noted that Fourier transforms and inverse Fourier transforms performed by the weight update computation modules 206 and 204 may be performed by using the T.D.Q./F.F.T. 192, I.F.F.T. 126 and T.D.Q./F.F.T 150, I.F.F.T. 166 respectively, on a time shared basis.

Other embodiments are within the spirit and scope of the appended claims.

What is claimed is:

1. A method of operating an asymmetric digital subscriber loop modem system wherein a modem at a central office transmits information to a modem at a remote terminal on a down-stream signal having a predetermined bandwidth and the modem at the remote terminal transmits information to the modem at the central office on an up-stream signal having a bandwidth lower than the predetermined bandwidth of the down-stream signal, comprising the steps of:

(a) producing digital samples of the up-stream signal in the central office modem at a rate greater than the Nyquist sampling rate;

(b) producing digital samples representative of an estimated echo signal in the central office modem; and (c) feeding the digital samples of the up-stream signal and the digital samples representative of an estimated echo signal to a subtractor at the same rate;

and wherein:

step (b) comprises feeding the down-stream signal to an echo cancellation system, such echo cancellation system decimating samples of the down-stream signal to produce samples at a predetermined rate;

step (a) comprises decimating the samples of the oversampled up-stream signal producing samples at the predetermined rate; and step (c) comprises feeding both the decimated samples of the oversampled up-stream signal and the samples produced by the echo cancellation system to the subtractor at the predetermined rate.

2. An asymmetric digital subscriber loop modem system wherein a modem at a central office transmits information to a modem at a remote terminal on a down-stream signal having a predetermined bandwidth and the modem at the remote terminal transmits information to the modem at the central office on an up-stream signal having a bandwidth lower than the predetermined bandwidth of the down-stream signal, such central office modem including an echo cancellation system for producing digital samples representative of an estimated echo signal in the central office modem, comprising:

an analog to digital converter for producing digital samples of the up-stream signal, wherein the analog to digital converter operates at a rate greater than the Nyquist sampling rate to oversample the up-stream signal in producing the digital samples thereof;

and a subtractor fed at the same rate fed with both the digital samples of the up-stream signal and the digital samples representative of an estimated echo signal, wherein the echo cancellation system includes a decimator for decimating samples of the down-stream signal; and wherein the modem system includes:

a decimator for decimating the samples of the oversampled up-stream signal producing samples at the predetermined rate; and wherein both the decimated samples of the oversampled up-stream signal and the samples produced by the echo cancellation system decimator are fed to the subtractor at the predetermined rate.

3. A method of operating an asymmetric digital subscriber loop modem system wherein a modem at a central office transmits information to a modem at a remote terminal on a down-stream signal having a predetermined bandwidth and the modem at the remote terminal transmits information to the modem at the central office on an up-stream signal having a bandwidth lower than the predetermined bandwidth of the down-stream signal, comprising the steps of:

producing interpolated digital samples of the up-stream signal in the remote terminal modem at a rate greater than the Nyquist sampling rate;

producing, in response to the interpolated digital samples, digital samples representative of an estimated echo signal in the remote terminal modem; and feeding digital samples of the down-stream signal and the digital samples representative of an estimated echo signal to a subtractor at the same rate.

4. An asymmetric digital subscriber loop modem system wherein a modem at a central office transmits information to a modem at a remote terminal on a down-stream signal having a predetermined bandwidth and the modem at the remote terminal transmits information to the modem at the central office on an up-stream signal having a bandwidth lower than the predetermined bandwidth of the down-stream signal, such remote terminal office modem comprising:

an interpolator for producing samples of the up-stream signal at a rate greater than the Nyquist sampling rate; and an echo cancellation system, fed by the samples produced by the interpolator, for producing digital samples representative of an estimated echo signal in the remote terminal modem, comprising:

an analog to digital converter for producing digital samples of the down-stream signal; and a subtractor fed at the same rate fed with both the digital samples of the down-stream signal and the digital samples representative of an estimated echo signal.

5. The asymmetric digital subscriber loop modem system recited in claim 4 including a decimator coupled between the analog to digital converter and the subtractor.

* * * * *